United States Patent Office 3,399,751
Patented Sept. 3, 1968

3,399,751
CONVERSION DEVICE FOR INTEGRAL
RECORDING OF PULSES
Hiroshi Hakata, Nara-shi, Japan, assignor to Shionogi &
Co. Ltd., Higashi-ku, Osaka, Japan, a corporation of
Japan
Filed Mar. 7, 1966, Ser. No. 532,414
Claims priority, application Japan, Mar. 18, 1965,
40/106,050
1 Claim. (Cl. 192—142)

ABSTRACT OF THE DISCLOSURE

A conversion device for integral recording of pulses, comprising a pulse motor which can be driven stepwise by input electric pulses, speed reduction and clutch means coupled to said pulse motor, a potentiometer coupled to said speed reduction and clutch means so as to be driven by said motor to rotate over a predetermined angular range, potentiometer biasing means coupled to said potentiometer for normally biasing said potentiometer in a direction opposite to that in which said potentiometer is driven from said pulse motor, clutch releasing means coupled between said potentiometer and said speed reduction and clutch means releasing said clutch means at the instant when said potentiometer reaches the upper limit of said angular range under the drive of said pulse motor to allow said potentiometer to return to its normal position under said biasing means ready to start another rotation over said angular range, and voltage responsive recording means electrically coupled to said potentiometer for recording the output voltages from said potentiometer, whereby upon each rotation of said potentiometer a predetermined number of successive input pulses is converted into an angle of rotation of said potentiometer and a corresponding output voltage as an integral of the input pulses.

This invention relates to conversion devices for use in integrating the number of incoming pulse signals and recording the pulse integral on a recording instrument in an analog fashion as a time function.

In the past, various forms of conversion devices of the character described have been proposed. In one form, a writing penholder is threadably fitted on a threaded shaft which is rotatable a predetermined angle each time a pulse arrives to drive the writing pen in a direction at right angles to that in which the recording sheet advances. In another, a vacuum tube or transistor type integrated circuit is employed to effect pulse integration and recording by electrical means. The former involves a deficiency that it is difficult to vary the recording sensitivity, that is, the pitch or advance per pulse of the record. The latter is not only complicated in structural arrangement but also is often unsatisfactory from the standpoint of the linearity of recording and the stability of operation.

The present invention is intended to provide a novel conversion device which is free from these difficulties and has a wide range of application despite the simplicity of its structure.

For a better understanding of the present invention, description will next be made with reference to the accompanying drawings, which illustrate a preferred embodiment of the invention, and in which.

Figure 1:
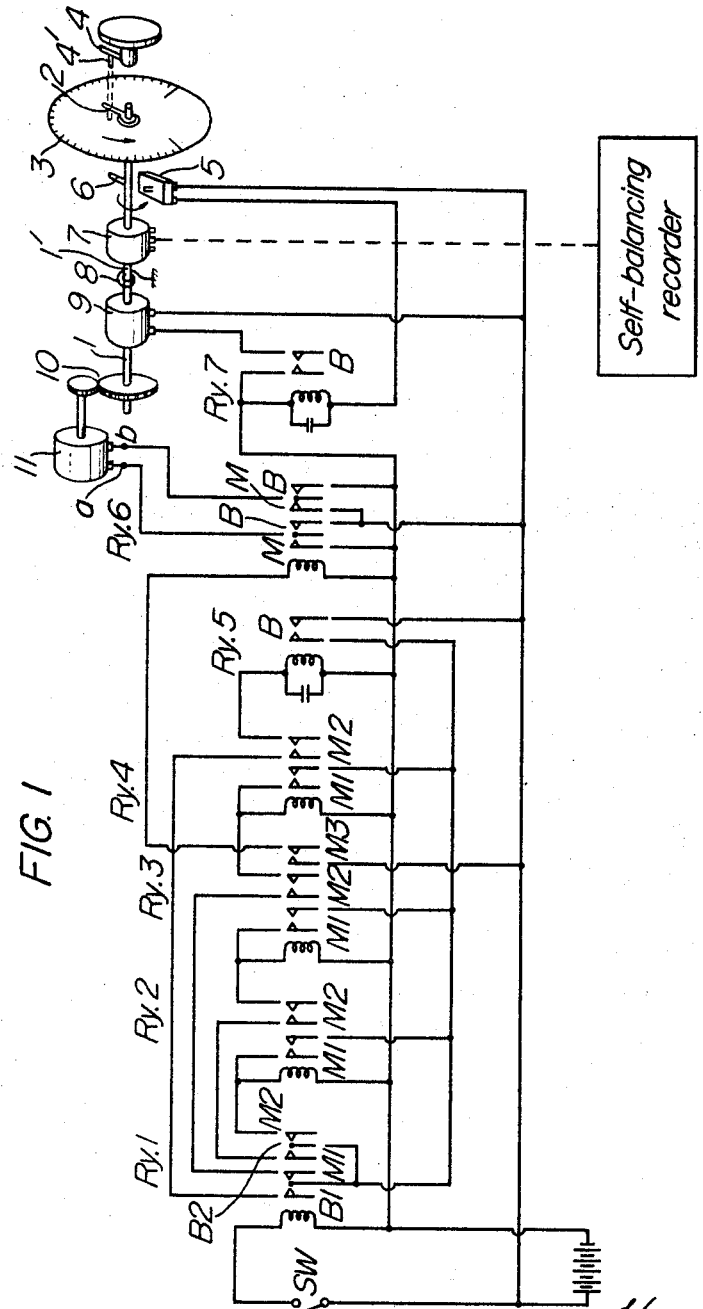
FIG. 1 is a diagram of the embodiment schematically showing the arrangement of component parts and illustrating the driving circuit connection.
Figure 3:
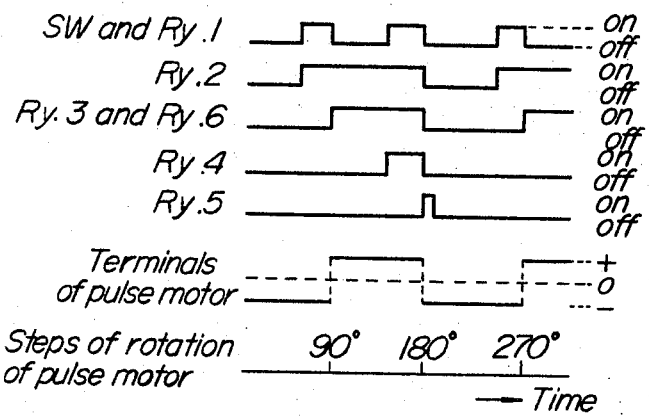
Figure 4A:
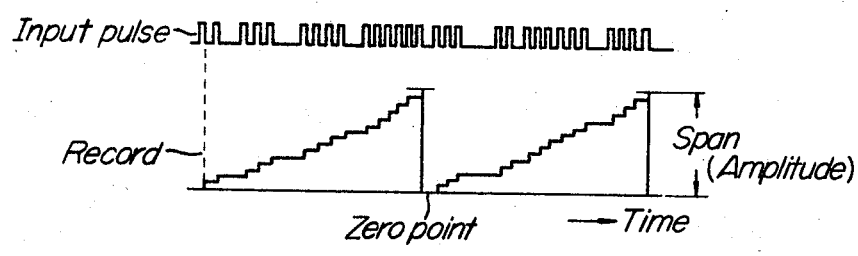
Figure 4B:
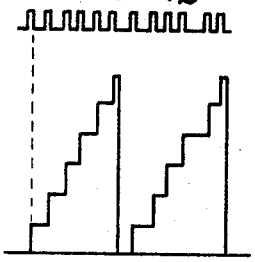
Figure 4C:
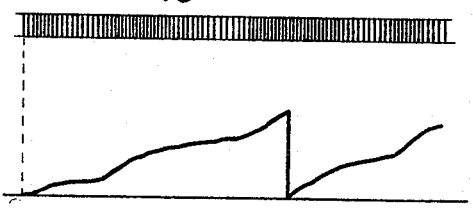

FIG. 3 diagrammatically illustrates the sequence of operation of the circuit shown in FIG. 1; and FIGS. 4a–4c are explanatory diagrams showing different forms of records obtainable according to the present invention.

Referring first to FIG. 1, the conversion device shown includes a pulse motor 11 the output shaft of which is connected through a reduction gear 10 with a shaft 1, which in turn is connected through the medium of an electromagnetic clutch 9 with another shaft 1'. Mounted on the latter shaft 1' are a potentiometer 7, a pawl or actuating finger 6 and an indicating needle 2 with a limit switch 5 arranged to be engaged by the finger 6. A scaled disc 3 is arranged concentrically with the shaft 1' and an adjustable setting needle 4 is provided to serve the purpose of defining the angular position to which the indicating needle 2 is to be restored. The electric circuit shown is provided to drive this system, as will be described in detail hereinafter.

In operation of this device, the pulse motor 11 is turned a unit angle each time an electric pulse arrives, thus rotating shaft 1' steps in one direction through the medium of reduction gear 10 and clutch 9. The shaft 1' carries with it potentiometer 7, indicating needle 2 and pawl 6 until the indicating needle 2 reaches the upper limit or the end of the scale on the disc 3. It is to be understood that the scaled disc 3, needle 2, pawl 6 and limit switch 5 are coordinated relative to each other so that the limit switch 5 is actuated by the pawl 6 just when the needle 2 has reached the end of the scale. Upon actuation of the limit switch 5 the clutch 9 is momentarily released to disconnect the shaft 1' from the shaft 1, allowing the latter to rotate in the reverse direction under the action of a helical spring 8 until the indicating needle 2 abuts against a stop 4' of the setting needle 4.

The above operation is repeated cyclically as electric pulses arrive in succession to drive the pulse motor. Thus, the potentiometer 7 mounted on the shaft 1' repeats, upon arrival of each pulse, the reciprocating movement between its normal set position and advanced position corresponding to the upper end of the scale on the disc 3. This reciprocating movement of the potentiometer is converted by appropriate means into an electric signal which can be recorded on a recording instrument as an integration of the incoming pulses.

Referring again to FIG. 1, description will next be made of the manner in which the pulse motor 11 is driven stepwise by the electric circuit means of FIG. 1. For simplicity's sake, it is assumed in this example that input pulses are given by the on-off operation of a switch SW and that characters M and B in the illustration indicate normally open and normally closed relay contacts, respectively.

When the switch SW is closed, current is passed through the coil of a relay Ry.1 to operate, so that another relay Ry.2 is actuated through the contact M2 of the relay Ry.1 and the contact B of a further relay Ry.5. The relay Ry.2 includes contact M1 for the self-holding purpose. Subsequently, when switch SW is turned off, relay Ry.3 is actuated through contact B2 of relay Ry.1 and contact M2 of relay Ry.2 and holds itself by its contact M1. Then, when the switch is again turned on, current is conducted through contact M1 of relay Ry.1 and contact M2 of relay Ry.3 to actuate relay Ry.4, which self-holds. Subsequently, when the switch SW is again turned off, the relay Ry.5 is actuated through contact B1 of relay Ry.1 and contact M2 of relay Ry.4 and thus the contact B of the relay Ry.5 is opened to release the self-holding state of relays Ry.2, Ry.3 and Ry.4 so that the circuit returns to its initial state. A capacitor is inserted in the relay Ry.5 in parallel to its coil for the purpose of maintaining the relay Ry.5 in its operating state for a short period of the order of a few milliseconds to ensure the releasing of the relays Ry.2, Ry.3 and Ry.4 when the contact B of relay Ry.5 is opened.

A further relay Ry.6 is operated by way of the contact M3 of relay Ry.3, and hence its operation is the same on-off operation as of the relay Ry.3. The relay Ry.6 has its contacts connected to the pulse motor 11 so that impressed across the input terminals a and b of the latter is a voltage alternating in polarity with the on-off operation of relay Ry.6. The pulse motor 11, in this case, of T1C make, is rotatable in one direction through an angle of 90 degrees each time the polarity of the input voltage is reversed and thus in synchronism with the operation of switch SW.

The above sequential operation of the relays and the pulse motor is graphically illustrated in FIG. 3.

On the other hand, when the limit switch 5 is actuated or depressed by the pawl 6 carried by the shaft 1', relay Ry.7 is operated so that the electromagnetic clutch 9 is momentarily released by the opening of contact B of Ry.7. On this occasion, the capacitor inserted in relay Ry.7 in parallel to its coil acts to maintain the operative state of relay Ry.7 for a short period of the order of a few milliseconds to ensure the restoration of the potentiometer and the associated system.

Figure 2:
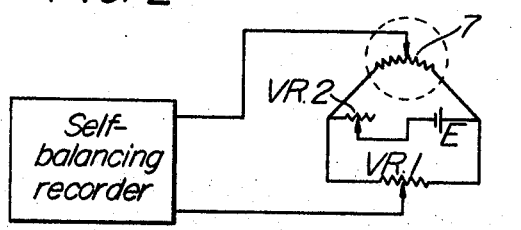
FIG. 2 is a circuit diagram of the potentiometer and the recording instrument.

Description will next be made of the connection between the potentiometer 7 and a recording instrument. The recorder may take various forms including a self-balancing type recorder and a pen-writing type electromagnetic oscillograph. In the example shown in FIG. 2, a self-balancing type recorder is employed in a Wheatstone bridge formation which includes a DC current source E and a variable resistor VR2 in series connection therewith. The potentiometer 7 and another variable resistor VR1 are included in respective arms of the Wheatstone bridge, as shown. With this arrangement, it will be noted that the angle of rotation of the potentiometer, that is, the integral of the input pulses can be converted into a corresponding voltage to be recorded on the recording instrument. Incidentally, the variable resistor VR1 serves the purpose of adjusting the zero point on the recording sheet while the variable resistor VR2 serves the purpose of adjusting the full span or amplitude of the record.

Some examples of records obtainable with the present device will next be explained with reference to FIG. 4. As shown in FIG. 4a, the record on the sheet rises step by step as input pulses arrive until the upper limit of the span of the record is reached, and subsequently the record is restored to the zero level. The setting needle 4 is adjustable to vary the restored position assumed when the clutch is released and in this manner the number of input pulses included in the full span of record can be freely selected. If the selected number of pulses is minorly limited and the span is increased by adjustment of the variable resistor VR2, the record obtained will be stepped coarsely, as shown in FIG. 4b. Contrariwise, if the number of pulses is increased and the span decreased, a smoother record will be obtained, as shown in FIG. 4c. With such smooth record, it will be obvious that any variation in pulse frequency or counting rate at any instant can be analysed upon the basis of the slope of the rising curve at that instant.

It will be apparent from the foregoing that, according to the present invention, a wide range of adjustment can be obtained as follows without necessitating complicated operation.

(1) Any coarse or fine pulse recording can be obtained as desired by selecting the number of pulses to be included in the full span of record.

(2) The magnitude of the full span of record on the recording sheet can be freely selected and hence the number of pulses included in each unit scale on the sheet can be calibrated with ease and accuracy.

(3) The zero point on the recording sheet can be shifted as desired.

Further advantageous features of the inventive device include the following:

(4) Recording of an excellent linearity can be effected by the use of a potentiometer exhibiting a satisfactory linearity between the angle of rotation and the resistance value.

(5) The operation of the device is extremely stable for an extended period of service.

With the embodiment shown and described herein, the range of adjustment actually obtained was from tens to hundreds counts for the full span of 20 cm., but it will be obvious that any different range of adjustment can be obtained by selecting the design of reduction gear 10. Further, the pulse motor used in this example was inherently limited in responding speed to 20 pulses per second, but various makes of pulse motor are now readily available on the market which have higher responding speeds, for example, of the order of 600 pulses per second. The DF7-48 type pulse motor provided by the Nippon Pulse Motor K.K. is one example of such highspeed pulse motor and, in cases where such highspeed motor is to be used, the driving circuit therefor should be properly modified. It will be apparent to those skilled in the art that many other changes and modifications may be made without departing from the spirit and scope of the invention as defined in the annexed claim.

What is claimed is:

1. A conversion device for integral recording of pulses, comprising a pulse motor which can be driven stepwise by input electric pulses, speed reduction and clutch means coupled to said pulse motor, a potentiometer coupled to said speed reduction and clutch means so as to be driven by said motor to rotate over a predetermined angular range, potentiometer having means coupled to said potentiometer for normally biasing said potentiometer in a direction opposite to that in which said potentiometer is driven from said pulse motor, clutch releasing means coupled between said potentiometer and said speed reduction and clutch means releasing said clutch means at the instant when said potentiometer reaches the upper limit of said angular range under the drive of said pulse motor to allow said potentiometer to return to its normal position under said biasing means ready to start another rotation over said angular range, and voltage responsive recording means electrically coupled to said potentiometer for recording the output voltages from said potentiometer, whereby upon each rotation of said potentiometer a predetermined number of successive input pulses is converted into an angle of rotation of said potentiometer and a corresponding output voltage as an integral of the input pulses.

References Cited

UNITED STATES PATENTS

| | | | |
|---|---|---|---|
| 2,029,349 | 2/1936 | Wagner | 307—141.4 |
| 2,971,623 | 2/1961 | Dirks | 192—142 |
| 3,120,298 | 2/1964 | Rossi | 192—142 X |

FRED C. MATTERN, JR., *Primary Examiner.*

ARTHUR T. MCKEON, *Assistant Examiner.*